Nov. 3, 1953                W. McCANDLESS                2,657,919
                          ELECTRIC SPEEDOMETER
Original Filed July 25, 1947                         3 Sheets-Sheet 1

INVENTOR.
WILLIAM McCANDLESS
BY
Talvey, Souther & Stoltenberg
ATTORNEYS

Nov. 3, 1953

W. McCANDLESS 2,657,919

ELECTRIC SPEEDOMETER

Original Filed July 25, 1947

INVENTOR.
WILLIAM McCANDLESS
BY Falvey, Souther & Stoltenberg
ATTORNEYS

Nov. 3, 1953

W. McCANDLESS 2,657,919

ELECTRIC SPEEDOMETER

Original Filed July 25, 1947

INVENTOR.
WILLIAM McCANDLESS
BY
Talvey, Suther & Stollenberg
ATTORNEYS

Patented Nov. 3, 1953

2,657,919

UNITED STATES PATENT OFFICE 2,657,919

ELECTRIC SPEEDOMETER

William McCandless, Toledo, Ohio

Original application July 25, 1947, Serial No. 763,546, now Patent No. 2,523,993, dated September 26, 1950. Divided and this application March 25, 1949, Serial No. 83,327

10 Claims. (Cl. 264—13)

1

This invention relates to speedometers, more particularly to a speedometer of an electrical type which is adapted to be installed as original factory equipment on automotive vehicles regardless of the position of the engine thereof or the position of the moving element of the vehicle from which the speed indications are initiated, or the position of the station to which the speed indications are transmitted and displayed to the operator.

The invention contemplates the provision of an improved electrical speedometer device which is energized from a direct current source by an initiating or translating device which cooperates with a moving part of the vehicle to translate the direct current into polyphase alternating currents which are transmitted to the receiving end where the polyphase alternating currents are utilized to drive an electric motor. The electric motor, in turn, drives the rotating magnets of an eddy current speed cup device which moves an indicating pointer in a measure having a relation to the speed of the moving part of the vehicle which initiated the polyphase alternating currents driving the electric motor.

The invention further contemplates providing an electrical speedometer device which obviates the use of contact points for telemetering, to a distant point, information relating to the speed and to the distance traversed by the vehicle to which the device is attached.

The invention further contemplates the provision of an electrical speedometer device utilizing polyphase currents to drive an electric motor which will indicate both the speed of the vehicle and also the distance traversed by the vehicle.

The invention further contemplates the provision of a novel mounting and bearing means for the indicating pointer, whereby fluttering of the indicating pointer is obviated, due to eccentricities and yet which will move in such a manner as to give an operator the impression that the pointer is operative without undue fluttering or sticking during operation.

The invention further contemplates providing a construction of an electrical speedometer which is rugged and which is suitable for mass production.

It is, therefore, a principal object of this invention to provide an improved electrical speedometer which utilizes polyphase alternating currents from translated direct current, in which the polyphase alternating currents are utilized to drive an electric motor, which will, in turn, drive devices indicating speed and also distance traversed by the vehicle.

2

It is a further object of this invention to provide a novel shaft suspension for an indicating pointer of a speedometer device which will prevent excessive fluttering thereof and yet will have sufficient movement to give the impression to an operator that the pointer is not stuck.

It is a further object of this invention to provide mechanical improvements of speedometer devices which will facilitate its fabrication in a mass production line and which will be rugged under service conditions.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Reference is made to Patent No. 2,523,993, issued September 26, 1950, maturing from application, Serial No. 763,546, filed July 25, 1947, of which this application is a division.

Figure 1:
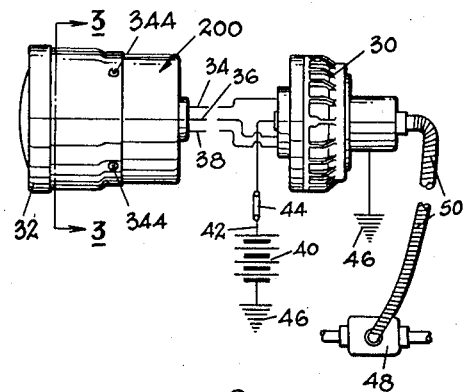
Fig. 1 is an elevational view of an apparatus incorporating the invention.

Referring to the drawings, particularly to Fig. 1, an initiating device or translator 30 is shown cooperating with a receiver or indicating device 32 and interconnected therewith by electrical conductors 34, 36, and 38. Electrical energy is supplied to the initiating device 30 by a storage battery 40 of the motor vehicle, to which the electrical speedometer of the invention is attached, and is connected thereto by means of conductor 42 which is controlled by a manual switch 44 such as, for example, the ignition switch of the vehicle. One side of the battery 40 is grounded at 46 and the circuit is completed by grounding the casing of the initiating device as shown.

The moving part or rotor of the initiating device 30 is rotated by means of a flexible cable 50, operatively connected thereto, one end of which is connected to the rotor and the other end to a moving part 48 of the vehicle which rotates in a proportional relationship to the ground speed of the vehicle. The driving connections between the rotor and the moving part 48 of the vehicle may comprise a flexible cable such as presently used in connection with speedometers of automotive vehicles and, being well known in the art, need not be described in further detail herein.

Figure 2:
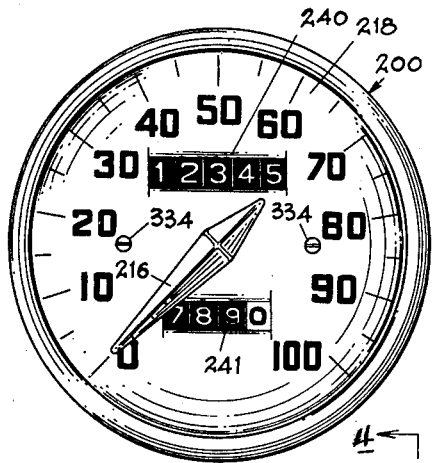
Fig. 2 is an elevational view of the face of the indicating device.

Referring again to Fig. 1, the leads 34, 36, and 38, which carry polyphase A. C. currents, are connected to an indicating device 200 which consists generally of an alternating current motor 202 (Fig. 4), which drives, by means of a shaft 204, a permanent magnet 206 of an eddy-current speedometer device which has a speed cup 208 and a field member 210. The speed cup is connected to a shaft 212, journaled in a special bearing sleeve 214, to be described in further detail hereinafter, to drive a pointer 216, which cooperates with a dial member 218, to indicate to an observer the desired indications of miles per hour through a transparent glass face 220, as is best shown in Fig. 2, which shows the pointer and dial as seen by an observer.

Figure 7:
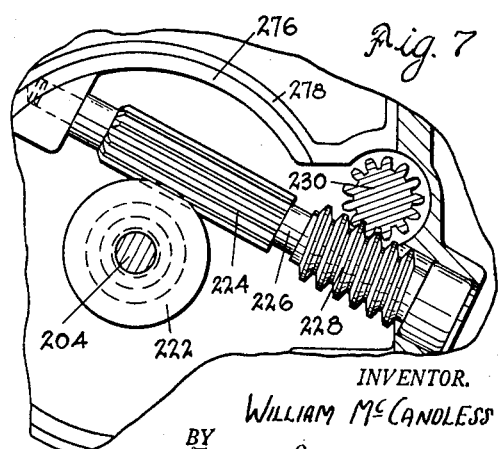
Fig. 7 is an elevational view, partly in section, of the odometer gear train.
Figure 8:
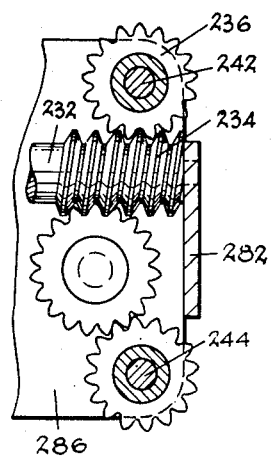
Fig. 8 is an elevational view, partly in section, of the odometer train.

Returning again to the shaft 204, which is driven by the electric motor 202, a worm 222 is connected thereto directly behind the permanent magnet 206 to drive, by means of a cooperating gear 224, spindle member 226 (Fig. 7), which is provided with a worm 228 to cooperate with a second gear 230 on spindle 232. The spindle 232 (Fig. 8) is similarly provided with a worm 234 which is utilized to drive, by means of suitable gear 236 of an odometer 238, best seen in Fig. 3 and observable through windows 240 provided in the dial 218. A pair of odometers may be provided, if desired, both being driven by the same gear train, already described, by other suitable gearing well known in the art which need not be described in further detail.

The odometers are mounted on shafts 242 and 244 in aligned parallel relation with the faceplate or dial 218, so that the indexes on the peripheries of the individual odometer wheels may clearly be seen by an observer through the windows 240 and 241 provided adjacent their forward portions. The construction of the odometers and their operation with reference to the present invention are well known in the art and will not be described in further detail. A novel holding means, however, is provided to cooperate with the shafts 242 and 244 to hold the shafts in fixed rotatable relation with a frame member which will be described in greater detail hereinafter.

Figure 4:
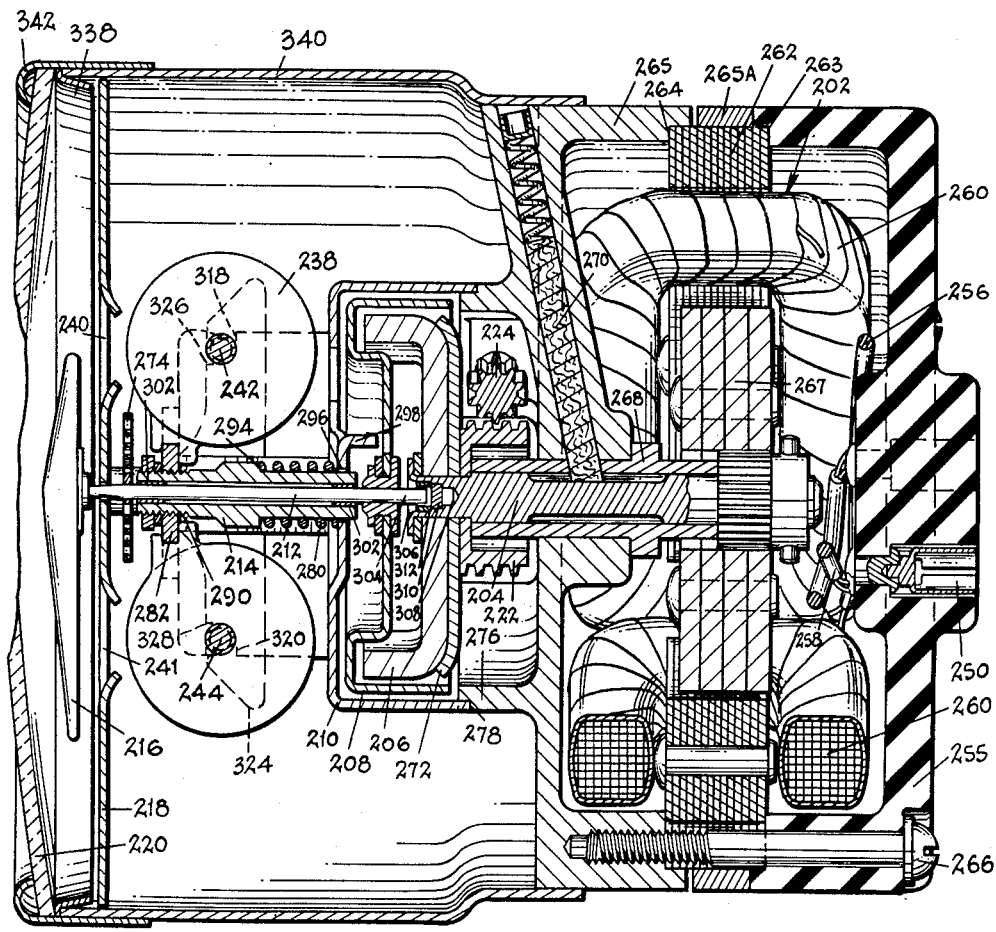
Fig. 4 is an elevational view, in section, of the indicating device taken along line 4—4 of Fig. 3.
Figure 6:
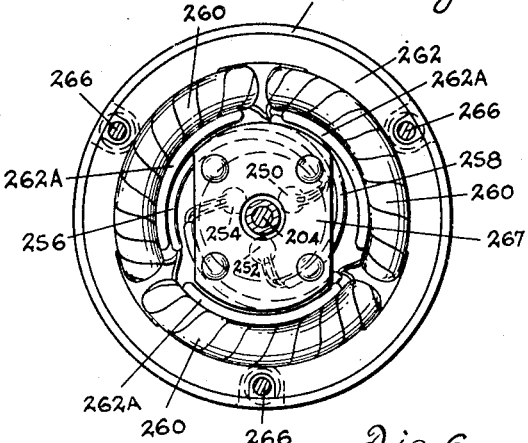
Fig. 6 is an elevational view, partly in section, of the motor mechanism.

Turning now to the motor 202, the three leads 34, 36, and 38 cooperate with terminals 250, 252, and 254, as shown in Fig. 6. The terminals are mounted sockets in an insulated cup 255, as is best shown in Fig. 4, where only the terminal 250 is shown in a sectional view. The three-phase currents which are introduced in the motor casing by these terminals are connected by leads such as 256 and 258 to the field coils 260 of the electric motor, being mounted in an annular laminated iron field structure 262 having pole shoes 262A, as is best shown in Fig. 6. The field structure 262 is circular in exterior form and is held in position by recesses 263 and 264 in the insulating cup 255 and a frame member 265 respectively, all being held in assembled relation by bolts 266 threaded into the frame member as shown. A spacer ring 265A may be provided if desired. The field coils 260 may be connected in either Y or delta.

The three pole shoes create a rotating field by the three-phase alternating current which acts upon an armature 267, preferably a permanent magnet and may be of unitary or of laminated construction, as shown in Fig. 4. The permanent magnet of the armature 267 is preferably in the form of a truncated cylinder, as shown in Fig. 6, or, if desired, it may be left in the form of a simple cylinder, and is strongly magnetized as to be polarized, so that it will rotate in synchronism with the rotating field created by the field coils 260.

The armature 267 of the motor 202 is fixedly attached to shaft 204 which is journaled in a bearing sleeve 268 fixed centrally in frame member 265, shown in section in Fig. 4, being provided with convenient oiling arrangements 270, as is well known in the art. As has been already described, the armature shaft 204 rotates the U-shaped permanent magnet 206 which is fixedly attached to the opposite end of the shaft 204. The magnet 206 is provided with a magnetic temperature compensator 272 on the rear face thereof, so that its field strength will remain substantially constant through temperature variations. As the magnet 206 is rotated by the armature 267 of the motor 202, it drags with it the speed cup 208 through the action of the magnetic flux of the magnet 206 cooperating with the fixed field member 210, against the bias of the hair spring 274 acting on the shaft 212 carrying the speed cup and pointer 216 as already described.

The polyphase alternating current created by the initiating device 30 creates a rotating field in the electric motor 202 which causes the armature 267 (permanent magnet) to rotate in synchronism therewith, whereby a predetermined relation is established between the rotation of the shaft 54 in the initiating device 30 and the rotation of the armature 267 of the motor 202. This predetermined relation is dependent upon the number of poles provided in the field member of the motor 202 and may vary, which, however, in the particular construction described herein, the shaft 54 and the shaft 204, rotate at the same speed in the initiating mechanism and the indicating mechanism respectively. The shaft 204 rotates the permanent magnet 206 and drags with it the eddy current speed cup 208 and thereby causes an angular rotation of the shaft 212, as indicated by the pointer 216 to create a balance between the magnetic drag on the speed cup 208 and the bias of hair spring 274. As the permanent magnet 206 is rotated at a higher rate, the angular displacement of the pointer 216, with reference to dial plate 218, will be increased until it is balanced by the displacement of the hair spring 274. This gives the desired indication by observing the relation between the pointer 216 and the dial 218. As the speed is retarded, the hair spring 274 returns the pointer toward the zero mark, which will be attained at the termination of rotation of the armature 267.

In order to support the field member 210 in concentric relation with the rotating magnet 206 and the eddy current speed cup 208, a hollow boss 276 is provided on the forward face of the frame member 265, being concentric with the shaft 204 and 212, as is most clearly shown in Fig. 4. The boss 276 terminates adjacent the rear face of the magnetic temperature compensator 272 and is provided with an annular boss 278 which cooperates with the lip of the cup-like element 210 to form a centering attachment therefor. The speed cup 210 is held on the boss 278 by means of a coil spring 280 embracing the bearing sleeve 214 which is fixedly attached to a bridge member 282 supported by a pair of abutments 284 and 286 extending from the forward face of the frame member 265, as is most clearly shown in Figs. 4 and 5. The bridge member 282 is held against the ends of the abutments 284 and 286 by means of screws 288 threaded into the forward face of the abutments.

The bearing sleeve 214, which supports and guides the spring member 280 upon its exterior, and also performs the function of journalling the shaft 212, which will be described in greater detail hereinafter, is provided with a threaded portion 290 adjacent its forward end which is threaded into an aperture in the bridge member 282 and is adjustably locked therein by means of a nut 292. The sleeve 214, being longitudinally adjustable, predetermines the tension of the coil spring 280 which abuts at its outer end against a shoulder 294, preferably formed at one terminus of a hexagonal portion of the sleeve 214 which allows convenient manipulation of the sleeve by a tool such as a wrench. The inner end of the sleeve 214 cooperates with a centrally-located aperture 296 in the field member 210, so that the sleeve 214 is given support at its inner end to give it additional strength as the journal means for the shaft 212. Adjacent the aperture 296, the coil spring 280 cooperates with the outer surface of the field member 210 so as to resiliently hold the field member 210 in its cooperative relation with the boss 276 of the frame member 265.

Figure 10:
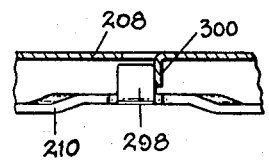
Fig. 10 is a plan view, partly in section, of the zero point stop.

The field member 210 is provided with a rearwardly-bent lug 298 which cooperates with a forwardly-struck lug 300, as shown in Fig. 10, on the speed cup 208 to form a stop member for predetermining the zero position of the pointer 216 as biased by means of the hair spring 274. The zero position is conveniently determined by rotating the field member 210 on the boss 276 so as to determine the touching relation between the lugs 298 and 300 on their respective members.

As has already been pointed out, the pointer shaft 212 is journaled in tube or sleeve 214 which has already been described as being fixedly attached (capable of adjustment) to bridge member 282 in predetermined concentric relation with the shaft 212 and the motor shaft 204. The sleeve 214 is provided with small internally positioned bearing sleeves 302 at its forward and rear ends which are preferably made of German silver and are conveniently positioned in the bore of the sleeve 214 by a press fit. The sleeves 302, adjacent the ends of the sleeve 214, form the main bearings for the shaft 212, which has fixedly positioned on it the speed cup 208 and the pointer 216. The shaft 212 has an inwardly projecting portion 304 with reference to the speed cup 208 which terminates in a central bore 306 of the shaft 204 adjacent the magnet 206. The shaft 306 is provided with a counter-bore 308 which forms a shoulder, against which is positioned a disc of tungsten 310 held in position by means of a small sleeve 312, press fitted into the bore 306. The plate 310 cooperates with the rounded end face of the projection 304 to form an end thrust bearing for the pointer assembly positioned on the shaft 212. The internal dimension of the sleeve 312 is substantially larger than the external dimension of the shaft fitted therein, so that the shaft will be entirely free from the effects of eccentricities of the shaft 204. However, the plate 310, coacting with the end of the projection 304 of the shaft 212, tends to allow a slight movement of the shaft 212 including the pointer assembly, whereby the observer is given the impression that the pointer and its mechanism is in operative condition.

Figure 3:
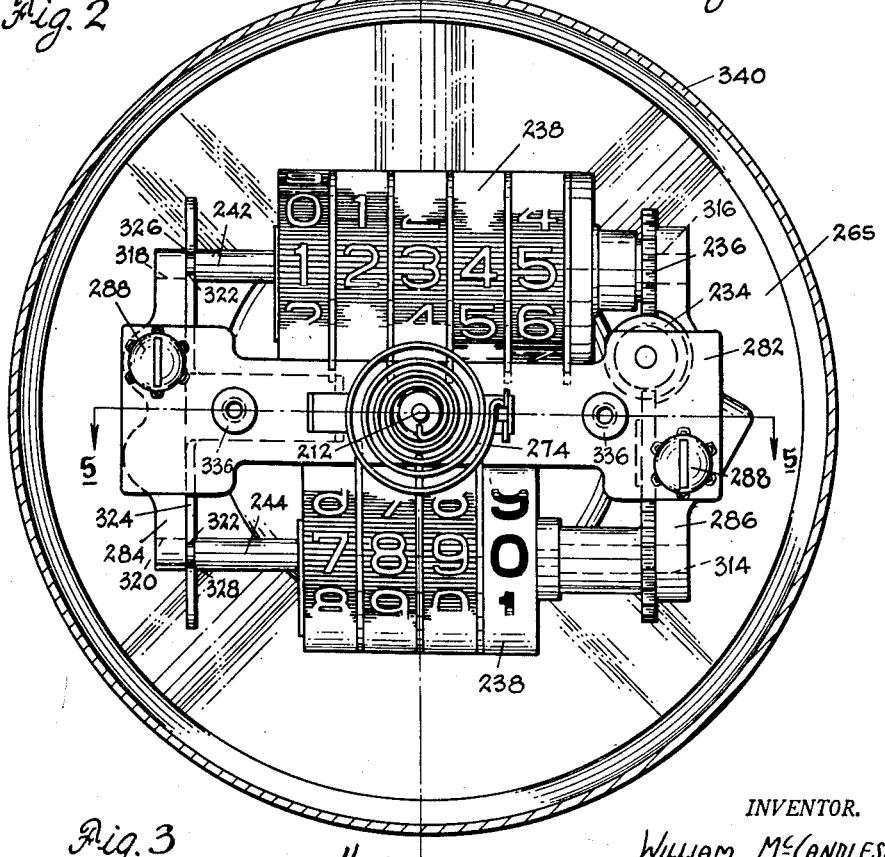
Fig. 3 is an elevational view, partly in section, taken along line 3—3 of Fig. 1.

As has been already pointed out in the description above, the two odometers 238 are mounted on shaft 242 and 244 which are held in spaced parallel relation in abutments 284 and 286 formed on the forward face of the frame member 265. The abutment 286 is provided with apertures 314 and 316 in which are journaled one end of shafts 244 and 242 respectively. This is best shown in Fig. 3, a plan view. Abutment 284 is provided with laterally opening slots 318 and 320 in which are positioned the opposite ends of the shafts 242 and 244. Adjacent these ends of the shafts 242 and 244 annular slots 322 are provided, one in each shaft which is coincident with and inwardly extending from the inner side of the abutment 284, as is most clearly shown in Fig. 3.

Figure 9:
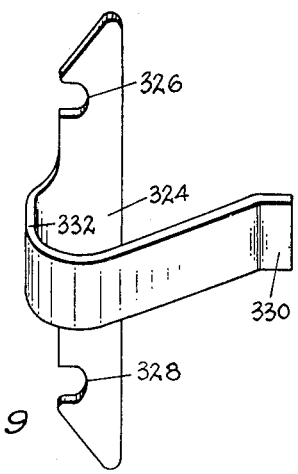
Fig. 9 is an isometric view of one of the parts.
Figure 5:
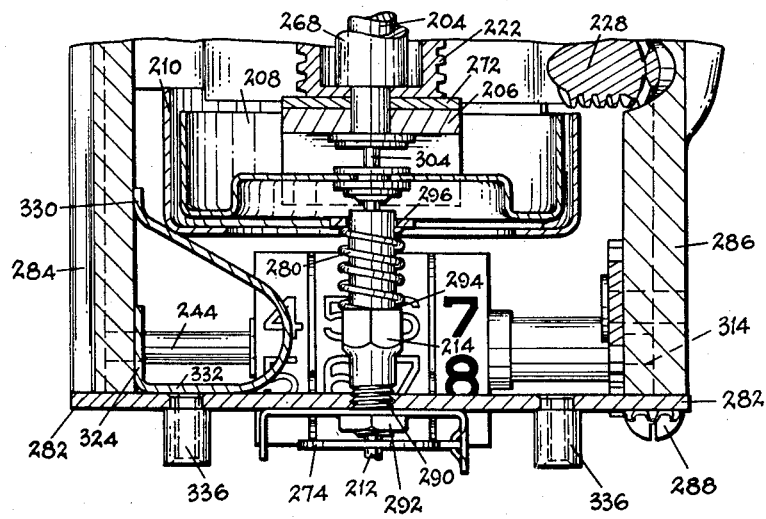
Fig. 5 is a plan view, in section, taken along line 5—5 of Fig. 3.

A spring member 324, shown in perspective in Fig. 9, is provided to cooperate with the annular slots 322 by means of transversely extending slots 326 and 328, formed on the upper side of the laterally extending arms of the spring member which is provided adjacent a central position with a fulcrum spring member 330 which rests against the upper surface of the field member 210 and the inner wall of the abutment 284, as is most clearly shown in Fig. 5, thence extends upwardly to contact the lower side of the bridge member 282, which it parallels for a short distance by its flattened portion 332. Thence the spring member 324 bends downwardly at right angles to cooperate with the inner face of the abutment 284, so that the slots 326 and 328 are positioned in the annular slots 322 of the shafts 242 and 244. The spring is adjusted in a manner to create an upward thrust against the shafts and, due to the fact that the slots 326 and 328 open transversely to the slots 318 and 320 of the abutment 284, the ends of the shafts 242 and 244 are held in operative position, firmly supported in the abutment 284. Should, however, an operator desire to remove the odometers from the abutments 284 and 286, he may readily do so by pushing downwardly upon the cross member of the spring 324 to release the slots 326 and 328 from the annular slots 322 in the ends of the shafts. This will allow removal of the shaft ends from the slots 318 and 320 and can thus be completely removed by disengaging the opposite ends of the shafts from the apertures 314 and 316 in the abutment 286. This provides a convenient and, at the same time, secure means for holding the odometer shafts in operative position in the abutments 284 and 286 forming a part of frame member 265.

The face-plate 218 is conveniently held in fixed relation to the assembly by means of attaching screws 334 (Fig. 2) which are threaded into pillars 336 (Fig. 5), riveted on to the forward face of bridge member 282. The glass face-plate 220, already described hereinbefore, cooperates with a bezel 330 on the forward end of an enclosing housing 340, being held together by means of a ring 342, as is well known in the art and need not be described in further detail. The housing 340 completely encloses the recording apparatus hereinbefore described, and is attached to the outer surface of the frame member 265 by means of screw 344 which is threaded into an aperture therein in an overlapping portion, as is most clearly shown in Fig. 1.

The construction of the odometers 233 and their driving means is conventional other than already described and will not be described in further detail.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In an indicating device, a frame member, a driven shaft journaled in said frame member for rotation therein, a hollow forwardly extending boss on the frame member concentric with the shaft, a magnet mounted transversely on said shaft and rotatable therewith within the hollow boss, a cup-like field member of magnetic material having its lip mounted in cooperative relation with said forwardly extending boss of a dimension to cooperate with the rotating magnet through a narrow air gap, an eddy-current drag cup of non-magnetic material positioned to rotate inside of the field member in the air gap between the field member and the rotating magnet, a mounting shaft for said drag cup coaxial with the first driven shaft and in contacting relation therewith adjacent the rotating magnet, forwardly extending lugs positioned on the frame member, a bridge member attached to and extending across said lugs, a bearing sleeve adjustably attached to said bridge and concentric with the secondary shaft and extending into said field member for cooperation therewith, bearing inserts in said sleeve for journaling said secondary shaft, a helical spring member mounted externally of said sleeve and cooperating with the exterior of said field member to hold the field member by tension against said boss, a hair spring mounted on said bridge member biasing said secondary shaft against the direction of rotation of said magnet, stop means on the field cup for determining the zero position of the secondary shaft as biased by the hair spring, and a pointer cooperating with said secondary shaft.

2. In a device of the class described, a base member, a rotatable shaft transversely journaled in the base member, a mounting boss on the base concentric with the shaft, a pair of pillars on the base member, a bridge member attached to the pillars in parallel relation with the base, a permanent magnet attached to the rotatable shaft, an eddy current cup with a concentric shaft cooperating with the magnet, journal means for the concentric shaft of the cup comprising a sleeve adjustably threaded into the bridge concentric with the first shaft, a cup-shaped field member of magnetic material having its lip fitted to the mounting boss exteriorly of the eddy current cup, the base of the field member having an aperture to cooperate with the adjustable sleeve, a helical spring on the sleeve anchored thereon at one end having its free end acting against the base of the field member to resiliently urge the field member against the mounting boss, a spring to bias the eddy current cup to a zero position stop and a pointer to indicate the angular displacement of the speed cup against the bias of the spring created by the eddy currents in the cup due to the rotation of the magnet.

3. In a magnetic speedometer, a rotating means including a polarized magnetic means, an eddy-current means cooperating with the rotating means to be rotatably influenced by the magnetic means against a bias for return to zero position, a pointer shaft on the eddy-current means concentrically rotatable by the eddy-current means under the influence of the rotating means, said shaft being in touching relation with the rotating means only at one end face, and spaced non-rotative bearing means for the pointer shaft at one side of the eddy-current means distal from the rotating means.

4. In a magnetic speedometer, a rotating means rotatable at a speed in proportion to the velocity of a vehicle, said rotating means including a polarized magnetic means, an eddy-current means cooperating with the rotating means through the magnetic field of the magnetic means to be rotatably influenced by the rotation of said magnetic means, a shaft for mounting the eddy-current means concentric with the rotating means and in touching relation therewith at only one end face, means active on said shaft to bias the eddy-current means to the zero position, and a pair of spaced non-rotative bearing means for the shaft positioned on one side of the eddy-current means.

5. In a magnetic speedometer, a rotating means including a polarized magnetic means, an eddy-current means cooperating with the rotating means through an air gap to be rotatably influenced by the magnetic field of the magnetic means, a pointer shaft on the eddy-current means to mount the eddy-current means for rotation on an axis concentric with the axis of rotation of the rotating means, said shaft projecting into cooperative touching relation with the rotating means at only one of its end faces, sleeve means adjustably mounted concentric with the pointer shaft, a pair of spaced bearing means in said sleeve for rotatably mounting said pointer shaft, and means to bias the pointer shaft and the eddy-current means to a zero position.

6. In a magnetic speedometer, a driven rotating means including a polarized magnetic means, an eddy-current means of non-magnetic material cooperating with the rotating means by an air gap to be rotatably influenced by the magnetic field of the magnetic means against a bias for return to zero position, a pointer shaft for rotatably mounting the eddy-current means concentrically with the rotating means, said shaft being in touching relation with the rotating means only at one end face, and spaced non-rotative bearing means for the pointer shaft on one side of the eddy-current means.

7. In a magnetic speedometer, a rotating means rotatable at a speed in proportion to the velocity of a vehicle said rotating means including a polarized magnetic means with a magnetic return, and eddy-current means of non-magnetic material cooperating with the rotating means in the magnetic field created by the magnetic means to be rotatably influenced by the rotation thereof, a shaft for mounting the eddy-current means concentric with the rotating means said shaft being in touching relation therewith only at one end face, means active on said shaft to bias the eddy-current means to the zero position, and spaced non-rotative bearing means for the shaft of the eddy-current means forwardly from the rotating means.

8. The device defined in claim 2 further characterized by the end face of the concentric shaft of the eddy-current cup being in touching relation with the rotatable shaft.

9. In a device of the class described, a non-magnetic base member, a rotatable shaft transversely journaled in the base member, permanent magnet means mounted on the rotatable shaft and adapted to be rotated thereby, a cup-shaped field member of magnetic material cooperating with the magnet means and having its lip mounted on the base member in concentric relation with the rotatable shaft, an eddy-current cup with a concentric shaft cooperating with the magnet means and the field member, journal means for the concentric shaft of the eddy-current cup comprising a sleeve longitudinally adjustable with reference to the base member and fitted into a central aperture of the field member, mounting means for the sleeve including the concentric shaft with reference to the base member, a helical spring cooperating with the sleeve being anchored at one end and acting at its other end against the base of the field member to resiliently urge the lip of the field member against the base member, and a spring to bias the eddy-current cup against rotation in one direction.

10. The device defined in claim 9 further characterized by a touching relation between the end face of the concentric shaft of the eddy-current cup and the rotatable shaft mounting the magnet means.

WILLIAM McCANDLESS.

References Cited in the file of this patent

UNITED STATES PATENTS

| Number | Name | Date |
|---|---|---|
| 1,371,096 | Howe et al. | Mar. 8, 1921 |
| 1,597,691 | Olsen | Aug. 31, 1926 |
| 1,670,836 | Berge | May 22, 1928 |
| 1,808,198 | Zubaty | June 2, 1931 |
| 1,933,086 | Bottegay | Oct. 31, 1933 |
| 1,962,538 | Toney | June 12, 1934 |
| 1,984,082 | Read | Dec. 11, 1934 |
| 2,027,589 | Helgeby | Jan. 14, 1936 |
| 2,046,163 | Helgeby | June 30, 1936 |
| 2,211,543 | Kollsman | Aug. 13, 1940 |
| 2,232,789 | Kollsman | Feb. 25, 1941 |
| 2,263,264 | Duwe | Nov. 18, 1941 |
| 2,273,848 | Ely et al. | Feb. 24, 1942 |
| 2,339,743 | Norman | Jan. 18, 1944 |